United States Patent

Yoon

[11] Patent Number: 5,863,564
[45] Date of Patent: Jan. 26, 1999

[54] MOLTEN RESIN STRAND FEEDING DEVICE WITH STRAND CUTTING MEANS

[75] Inventor: Young Sool Yoon, Kyungnam, Rep. of Korea

[73] Assignee: Han Jin Ind. Co., Ltd., Kyungnam, Rep. of Korea

[21] Appl. No.: 852,423
[22] Filed: May 8, 1997
[51] Int. Cl.$^6$ .................................................. B29C 47/88
[52] U.S. Cl. ........................... 425/71; 425/190; 425/215; 425/311
[58] Field of Search .............................. 425/71, 190, 196, 425/215, 311, 316

[56] References Cited

U.S. PATENT DOCUMENTS

| | | | |
|---|---|---|---|
| 4,025,252 | 5/1977 | Hunke | 425/71 |
| 4,528,157 | 7/1985 | Lettner et al. | 425/71 |
| 4,530,649 | 7/1985 | Philipp et al. | 425/71 |
| 4,913,899 | 4/1990 | Hartig | 425/71 |

FOREIGN PATENT DOCUMENTS 1-39323  8/1989  Japan .

*Primary Examiner*—James P. Mackey
*Attorney, Agent, or Firm*—Longacre & White

[57] ABSTRACT

A molten strand feeding device having a strand cutting apparatus. In the device, a movable unit is placed at the upper end of a cooling trough so that it is movable linearly in a direction parallel to the nozzle surface thus improving the strand cutting effect at the very beginning of the molten strand emerging from nozzles. The cooling trough is coupled to a hinged joint at the rear center and is selectively rotatable relative to the nozzle surface so that the device is selectively changed between the horizontal and vertical types. A spring-biased strand cutting apparatus is provided at the upper end of the movable unit so that the cutting apparatus is brought into close contact with the nozzle surface and smoothly moves on the nozzle surface without giving an impact on the nozzle surface, thus improving the strand cutting effect.

6 Claims, 9 Drawing Sheets

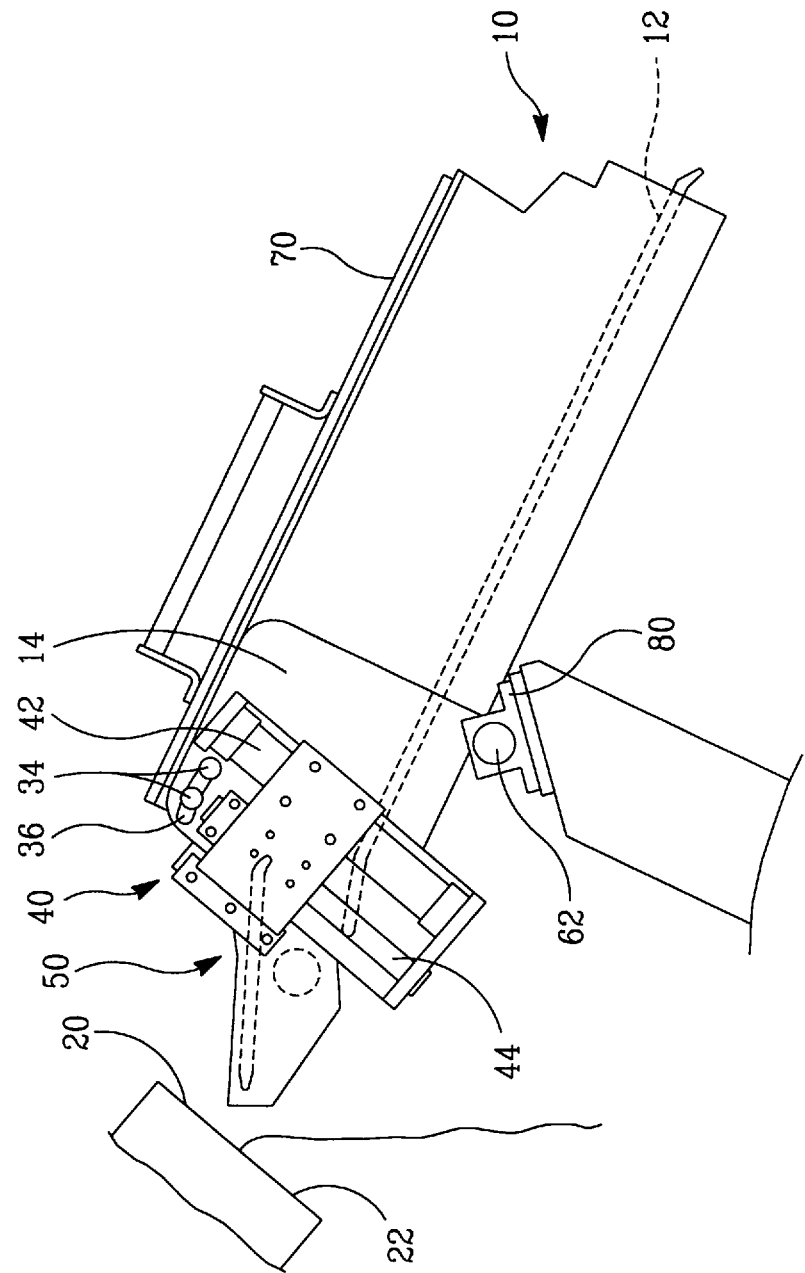

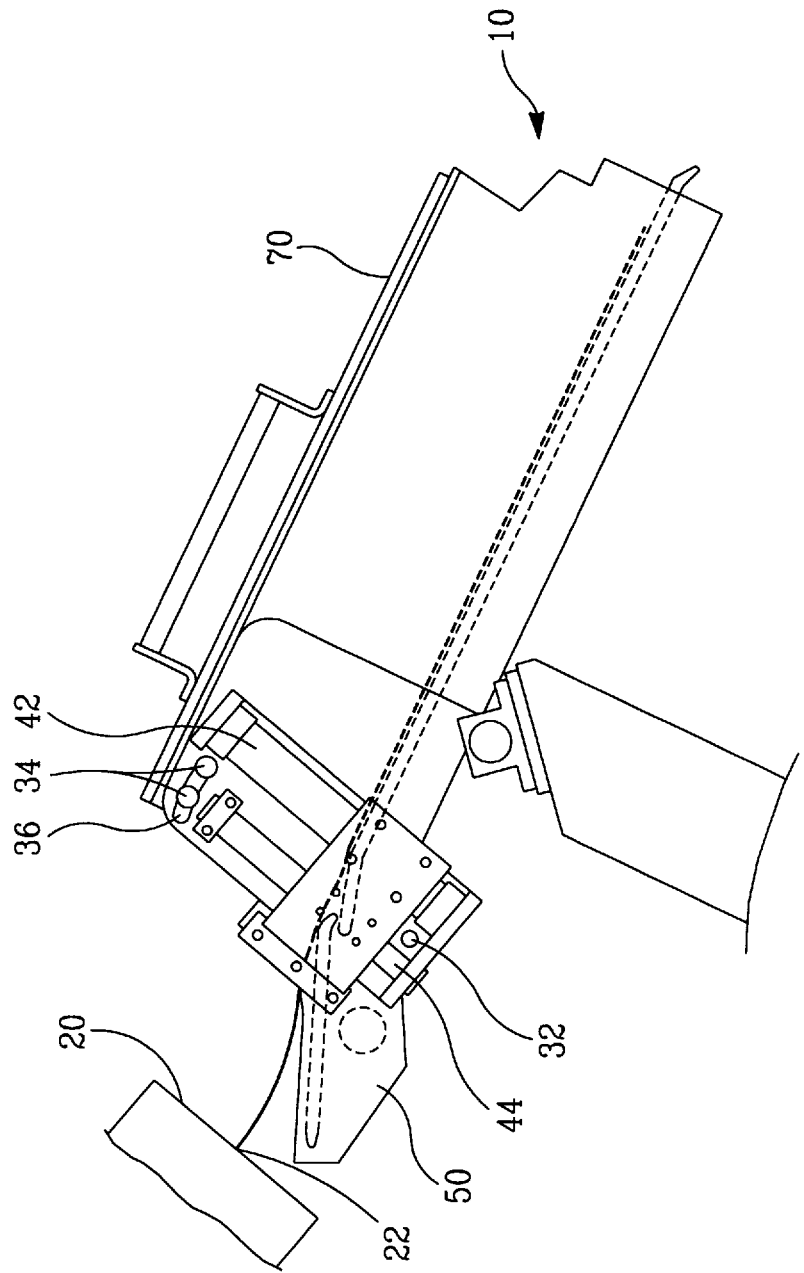

MOLTEN RESIN STRAND FEEDING DEVICE WITH STRAND CUTTING MEANS

BACKGROUND OF THE INVENTION

1. Field of the Invention

The present invention relates, in general, to a molten strand feeding device used for controllably feeding molten resin strands to a strand granulator while removing first bad strands during a thermoplastic forming process and, more particularly, to a strand feeding device not only provided with a strand cutting means, suitable for effectively removing the bad strands at the very beginning of the molten strand emerging from the nozzles, but also easily changed between the horizontal and vertical types.

2. Description of the Prior Art

In a process of forming fabrics or other products from molten thermoplastic resin, the molten thermoplastic resin is primarily formed into strands using extrusion nozzles of a nozzle surface prior to being fed to a strand granulator. The molten resin strands, emerging from the extrusion nozzles, are fed onto a cooling trough (hereinbelow, selectively called by the term "cooling trough", "discharge trough" or "drainage trough") thus being cooled prior to being fed to a strand granulator. As the molten resin strands emerge from the extrusion nozzles, the start strands typically have bad quality due to difference in heating temperatures or bad match of colors so that it is necessary to remove the bad strands at the very beginning of the strand emerging from the nozzles.

FIG. 7 shows a conventional horizontal-type strand feeding device disclosed in U.S. Pat. No. 4,528,157, while FIG. 8 shows a conventional vertical-type strand feeding device disclosed in Japanese Patent Publication No. 89-39323.

In the conventional horizontal-type device (disclosed in the above U.S. patent), a slidably movable segment is placed at the upper end of the cooling or discharge trough in a way such that it is movable between operating and non-operating positions as shown in FIG. 7. A separating element is installed at a position above the cooling trough and is operated in cooperation with the movable segment. The above separating element of the device cuts away the bad strands as the movable segment is in its operating position. Meanwhile, when the movable segment is in its non-operating position, the strands are permitted to freely pass down at the side of the cooling trough.

In the above device, the movable segment moves horizontally between the operating and no-operating positions, while the nozzle surface is inclinedly arranged relative to the horizontal moving passage of the movable segment at an angle of inclination. Due to the positional relation between the movable segment and the nozzle surface, the cutter integrated with the tip of the separating element primarily comes into pressurized contact with the nozzle surface prior to sliding on the inclined nozzle surface when it cuts away the bad strands emerging from the nozzles. In this regard, the cutter of the separating element may be bent, deformed or exceedingly abraded as it repeatedly comes into pressurized contact with the nozzle surface and cuts away the bad strands emerging from the nozzles. The cutter thus fails to be brought into close contact with or to smoothly move on the nozzle surface thereby reducing the operational effect while cutting away the bad strands.

Another problem of the horizontal-type device resides in that the discharge trough is fixedly arranged horizontally so that the position of the trough cannot be adjusted even when the inclination angle of the nozzle surface is unexpectedly changed into another angle.

Meanwhile, the vertical-type device (disclosed in the above Japanese patent) includes at least one nozzle and a drainage trough. The drainage trough controllably feeds the molten resin strand emerging from the nozzle. The drainage trough comprises an upper end, which selectively guides the strand to one of two passages: a strand feeding passage extending onto the trough and a strand falling passage extending at the side of the trough. The device also has a strand collector, which is arranged on the strand falling passage at the side of the trough and collects the strand falling down from the nozzle. The drainage trough is rotatable around a rotating shaft so that the trough can move between operating and non-operating positions. In its operating position, the trough is placed on the strand falling passage thus catching the strand emerging from the nozzle. When the trough is in its non-operating position, it is spaced apart from the strand falling passage, thus failing to catch the strand and permitting free passage of the strand at the side of the trough. In the operating position of the drainage trough, the upper end of the trough is brought into its operating position at which the upper end of the trough guides the strand onto the lower end of the trough. The upper end of the trough can be moved into its non-operating position permitting free passage of the strand at the side of the trough.

In the above vertical-type device, the upper end of the trough has to rotate around the rotating shaft relative to the horizontal nozzle surface so that it is brought into its strand cutting position. Such a rotating motion of the upper end reduces the strand cutting effect of the device.

Another problem of the vertical-type device resides in that the discharge trough is fixedly arranged vertically so that the position of the trough cannot be adjusted even when the angle of the nozzle surface is unexpectedly changed into another angle.

SUMMARY OF THE INVENTION

Accordingly, the present invention has been made keeping in mind the above problems occurring in the prior art, and an object of the present invention is to provide a molten strand feeding device, which is provided with a movable unit being placed at the upper end of a cooling trough and being movable linearly in a direction parallel to a nozzle surface thus improving the strand cutting effect at the very beginning of the molten strand emerging from nozzles.

Another object of the present invention is to provide a molten strand feeding device, of which the cooling trough is coupled to a hinged joint at the rear center thus being selectively rotatable relative to the nozzle surface and allowing the device to be selectively changed between the horizontal and vertical types.

A further object of the present invention is to provide a molten strand feeding device, which has a spring-biased strand cutting means at the upper end of the movable unit and allows the cutting means to be brought into close contact with the nozzle surface and to smoothly move on the nozzle surface without giving an impact on the nozzle surface thus improving the strand cutting effect.

In order to accomplish the above object, the present invention provides a molten resin strand feeding device, which is used for controllably feeding molten resin strands emerging from nozzles of a nozzle surface to a strand granulator while cutting away first bad strands, comprises a cooling trough sided by two side panels and a cooling pipe extending on the trough and selectively spraying coolant onto molten strands passing over the trough thus cooling the strands, and further comprises: a rotatable panel mounted at the upper end of each of the side panels and having a rotating shaft and an adjusting slit at both ends, the adjusting slit receiving a plurality of lock bolts thus allowing the rotatable panel to be selectively rotatable around the rotating shaft; a drive unit installed outside the rotatable panel; a movable unit held by the drive unit at each end thus being linearly movable in parallel to the nozzle surface, the movable unit having a guide panel used for cutting away the first bad strands emerging from the nozzles at the very beginning of the strand emerging from the nozzles; and rotating means for allowing the cooling trough to be selectively rotated relative to the nozzle surface, the rotating means being provided on the rear center of the cooling trough.

BRIEF DESCRIPTION OF THE DRAWINGS

The above and other objects, features and other advantages of the present invention will be more clearly understood from the following detailed description taken in conjunction with the accompanying drawings, in which:

FIGS. 3a and 3b are views showing the strand feeding device of this invention, with a cooling trough being positioned horizontally relative to the nozzle surface, in which;

FIG. 3a shows a pre-cutting stage wherein the bad strands emerge from the nozzle;

FIG. 3b shows a post-cutting stage wherein the good strands emerge from the nozzle after the bad strands are cut away by a strand cutting means of the device;

DESCRIPTION OF THE PREFERRED EMBODIMENTS

Figure 1:
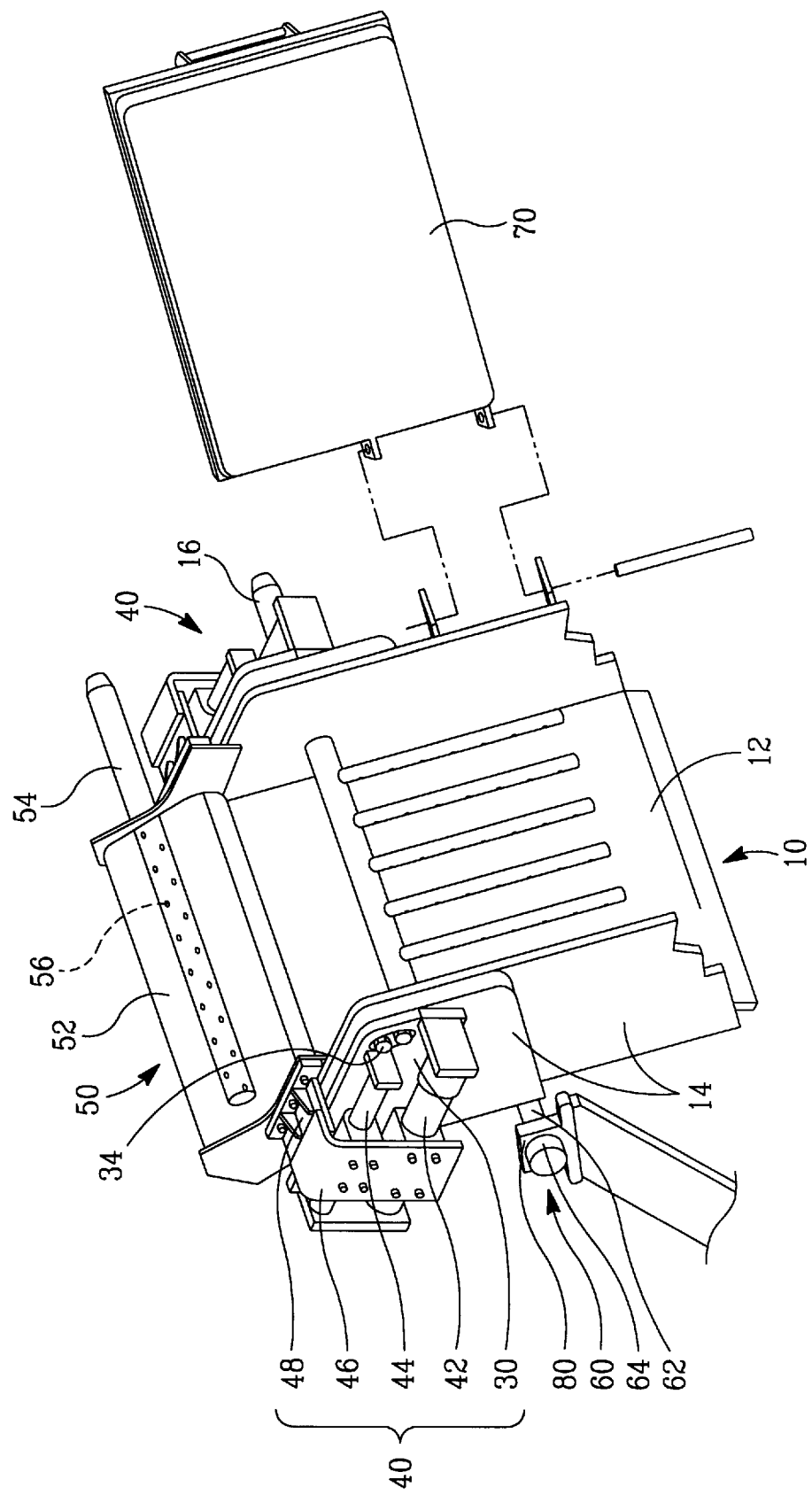
FIG. 1 is a perspective view of a strand feeding device according to the preferred embodiment of the present invention.
Figure 2:
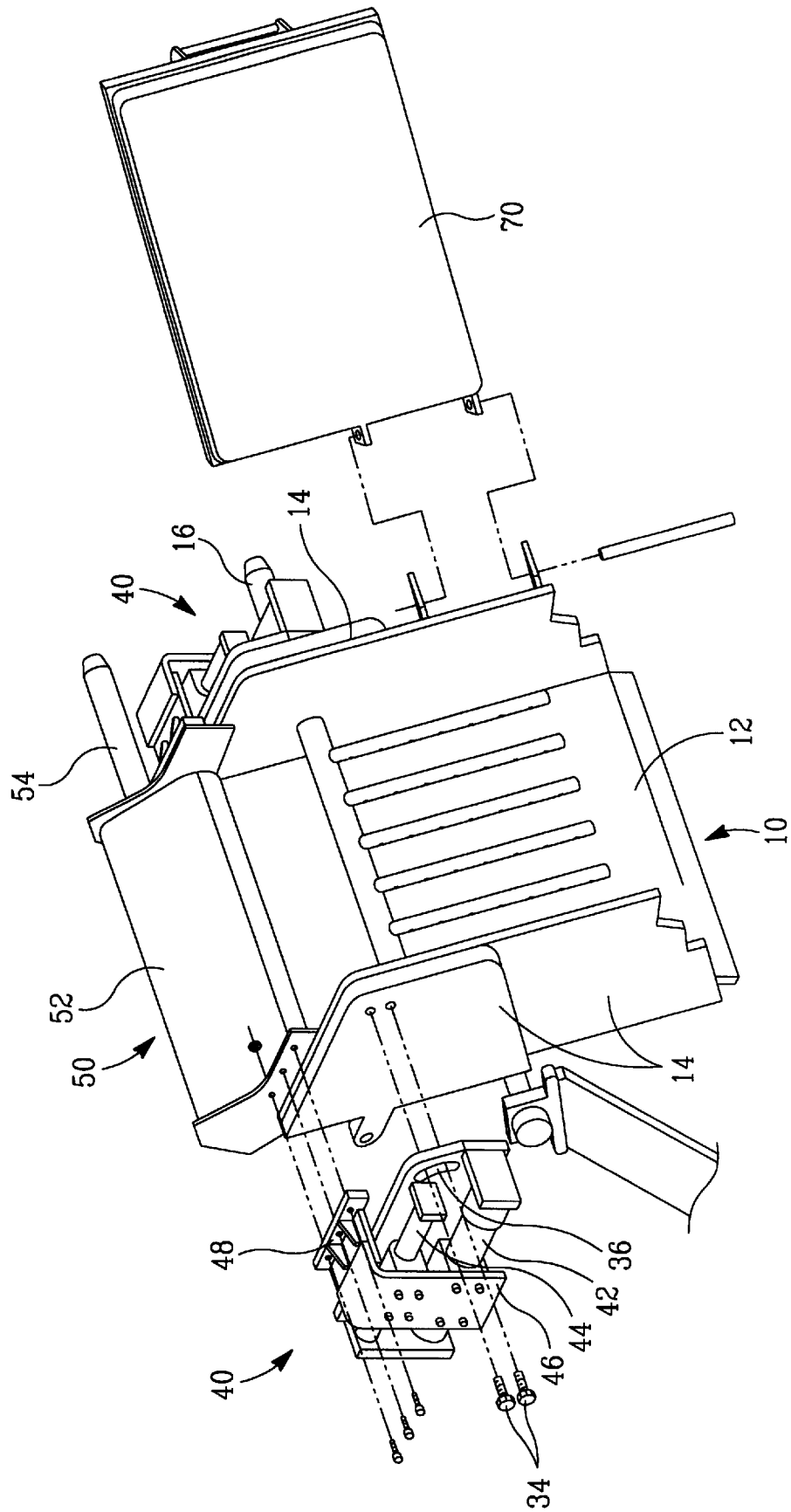
FIG. 2 is an exploded perspective view of the strand feeding device of this invention.

FIG. 1 is a perspective view of a strand feeding device according to the preferred embodiment of the present invention. FIG. 2 is an exploded perspective view of the above strand feeding device.

A plurality of molten thermoplastic resin strands emerge from the extrusion nozzles 22 of a nozzle surface 20 and are fed to a strand granulator (not shown) under the control of the strand feeding device of this invention. The strand feeding device has a cooling means 10, which comprises a cooling trough 12 sided by two side panels 14. A cooling pipe 16 is installed on the trough 12 and selectively sprays coolant onto the molten strands passing over the trough 12, thus cooling the strands.

A rotatable panel 30 is mounted at the upper end of each side panel 14. The rotatable panel 30 has a rotating shaft 32 and an adjusting slit 36 at both ends. The above panel 30 is rotatable around the rotating shaft 32 and is selectively fixed to an associated side panel 14 at an adjusted position by tightening a plurality of lock bolts 34 received in the adjusting slit 36.

A drive unit 40 is installed at each side of the cooling means 10 at a position outside each rotatable panel 30. The drive unit 40 also holds a movable unit 50, which is linearly movable in parallel to the nozzle surface 20.

That is, the movable unit 50 is held by the two drive units 40 at both ends and is used for cutting away the first bad strands emerging from the nozzles 22 at the very beginning of the strand emerging from the nozzles 22.

The rear center of the cooling means 10 is coupled to a hinged joint 60 so that the cooling means 10 can be rotatable relative to the nozzle surface 20. Therefore, it is possible to change the position of the cooling means 10 relative to the nozzle surface 20.

Each of the drive unit 40 comprises a rodless cylinder 42, which is positioned outside each rotatable panel 30 and linearly moves during the operation of the device. A guide shaft 44 guides the drive unit 40 during the linear movement of the rodless cylinder 42. Both the cylinder 42 and the guide shaft 44 are covered with and held by a bracket 46. The drive unit 40 is connected to the movable unit 50 through a connection part 48, which is provided at the upper end of the bracket 46.

A perforated cooling pipe 54 is installed inside the movable unit 50 and cools the front guide panel 52 of the movable unit 50.

The hinged joint 60 includes a rotating shaft 62, which is mounted to a support bracket 80. In order to adjust the angular position of the rotating shaft 62 and hold the adjusted position of the rotating shaft 62, the hinged joint 60 also includes an angle control means 64.

The strand passage, which is defined by both the cooling trough 12 and two side panels 14 and in which the cooling pipe 16 extends, is covered with a cover panel 70 thus preventing the coolant coming out of the pipe 16 from splashing outside the strand passage.

The operational effect of the above device will be described hereinbelow.

When the molten resin strands emerge from the nozzles 22, the start strands typically have bad quality due to difference in heating temperatures or bad match of colors in the same manner as described for the prior art device. Therefore, it is necessary to remove such bad strands at the very beginning of the strand emerging from the nozzle 22. The device of this invention automatically and effectively cut away the bad strands and in turn smoothly feeds the continued strands or good strands onto the cooling trough 12, on which the coolant continuously flows from the cooling pipe 16. A plurality of longitudinal grooves are formed on the trough 12 and guide the good strands to the lower end of the trough 12. While the good strands pass over the trough 12, the cooling pipe 16 sprays coolant onto the strands thus cooling the strands. The cooled strands are in turn fed to the strand granulator, which performs a strand granulating process.

In the device of this invention, the first bad strands emerging from the nozzles 22 of the nozzle surface 20 are cut away and collected separately. After cutting away the bad strands, the device feeds the good strands, emerging from the nozzles 22 in succession to the bad strands, to the strand granulator. At the time the good strands initially emerge from the nozzles 22, the rodless cylinders 42 of the two drive units 40 are manually or automatically started so that the inclination of each cylinder 42 is equalized to that of the nozzle surface 20. The two rodless cylinders 42 are thus arranged in parallel to the nozzle surface 20. In the above state, the movable unit 50 connected to the rodless cylinders 42 moves linearly in accordance with the movement of the cylinders 42. In this case, the movable unit 50 having the front guide panel 52 moves parallel to the nozzle surface 20 while cutting away the first bad strands emerging from the nozzles 22. In this case, the strand cutting operation is carried out by a strand cutting means, mounted to the movable unit 50, as will be described later herein.

After the first bad strands are completely cut away by the movable unit 50, the good strands start to emerge from the nozzles 22. In this case, the movable unit 50 is placed on the strand passage from the nozzles 22 so that the good strands are caught by the front guide panel 52 of the unit 50 and in turn are guided to the granulator under the guide of the cooling trough 12. The guide front panel 52 is inclined downward at an angle of inclination so that the panel 52 smoothly guides the good strands in cooperation with the coolant from the cooling pipe 16. After the good strands are completely fed to the granulator, the rodless cylinder 42 returns to its original position thus causing the inclined movable unit 50 to move upward, with the top end of the unit 50 being constantly paralleled to the nozzle surface 20. The device is thus brought into a standby state for a next strand feeding work.

In the above operation of the device, pressurized coolant is sprayed from the perforations 56 of the cooling pipe 54, extending in the movable unit 50, onto the back surface of the front guide panel 52 thus primarily cooling the strands passing over the guide panel 52. The primarily-cooled strands in turn passes over the cooling trough 12 thus being finally cooled while being fed to the granulator.

The inclination of the nozzle surface 20 may be unexpectedly changed during the operation of the device. In this case, the rodless cylinder 42 is not paralleled to the nozzle surface 20 so that it is necessary to adjust the position of the cylinder 42 relative to the nozzle surface 20. In order to achieve the above object, the lock bolts 34, received in the slit 36 of each rotatable panel 30, are loosened and removed from each side panel 14 prior to bringing the cylinder 42 into a position parallel to the nozzle surface 20. Therefore, it is possible to keep the rodless cylinder 42 parallel to the nozzle surface 20. That is, each rotatable panel 30, having both the rodless cylinder 42 and the guide shaft 44, can be rotated around the rotating shaft 32.

Figure 4:
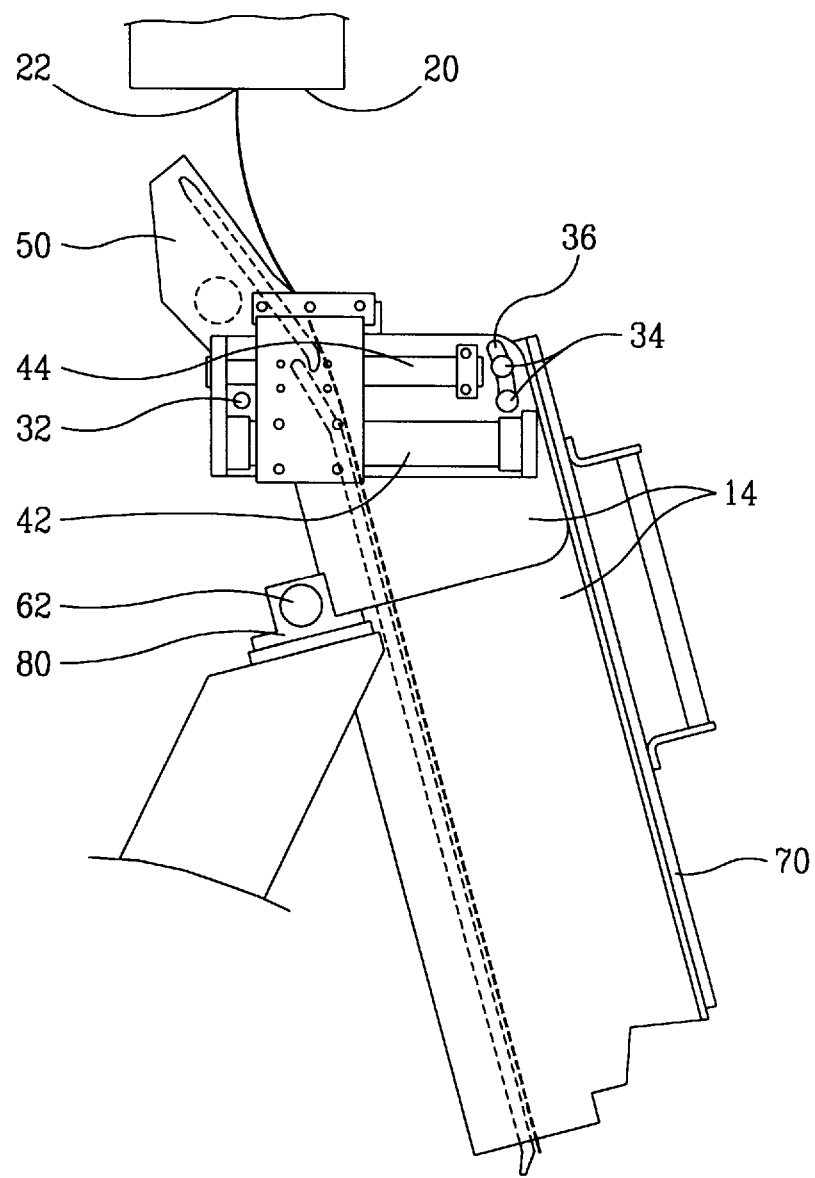
FIG. 4 is a view showing the strand feeding device of this invention, with the cooling trough being positioned vertically relative to the nozzle surface.

FIGS. 3a and 3b show the strand feeding device of this invention, with the cooling means 10 being positioned horizontally relative to the nozzle surface 20. FIG. 4 shows the strand feeding device with the cooling means 10 being positioned vertically relative to the nozzle surface 22.

As shown in the drawings, the position of the cooling means 10 relative to the nozzle surface 20 is selectively changed between the horizontal and vertical positions in accordance with both the work and mechanical conditions of the strand feeding work so that the type of the device can be changed between the horizontal and vertical types. In order to change the type of the device into the horizontal type shown in FIGS. 3a and 3b, the nozzle surface 20 is inclinedly positioned, while the cooling means 10 is rotated relative to the inclined nozzle surface 20. In this case, the cooling means 10 is rotated around the rotating shaft 62 of the hinged joint 60 into an appropriate position. The rotating angle of the cooling means 10 in the above state is controlled by the angle control means 64.

Meanwhile, in order to change the type of the device into the vertical type shown in FIG. 4, the nozzle surface 20 is horizontally positioned, while the cooling means 10 is rotated relative to the horizontal nozzle surface 20. Therefore, the device of this invention can be easily changed between the vertical and horizontal types.

Figure 5:
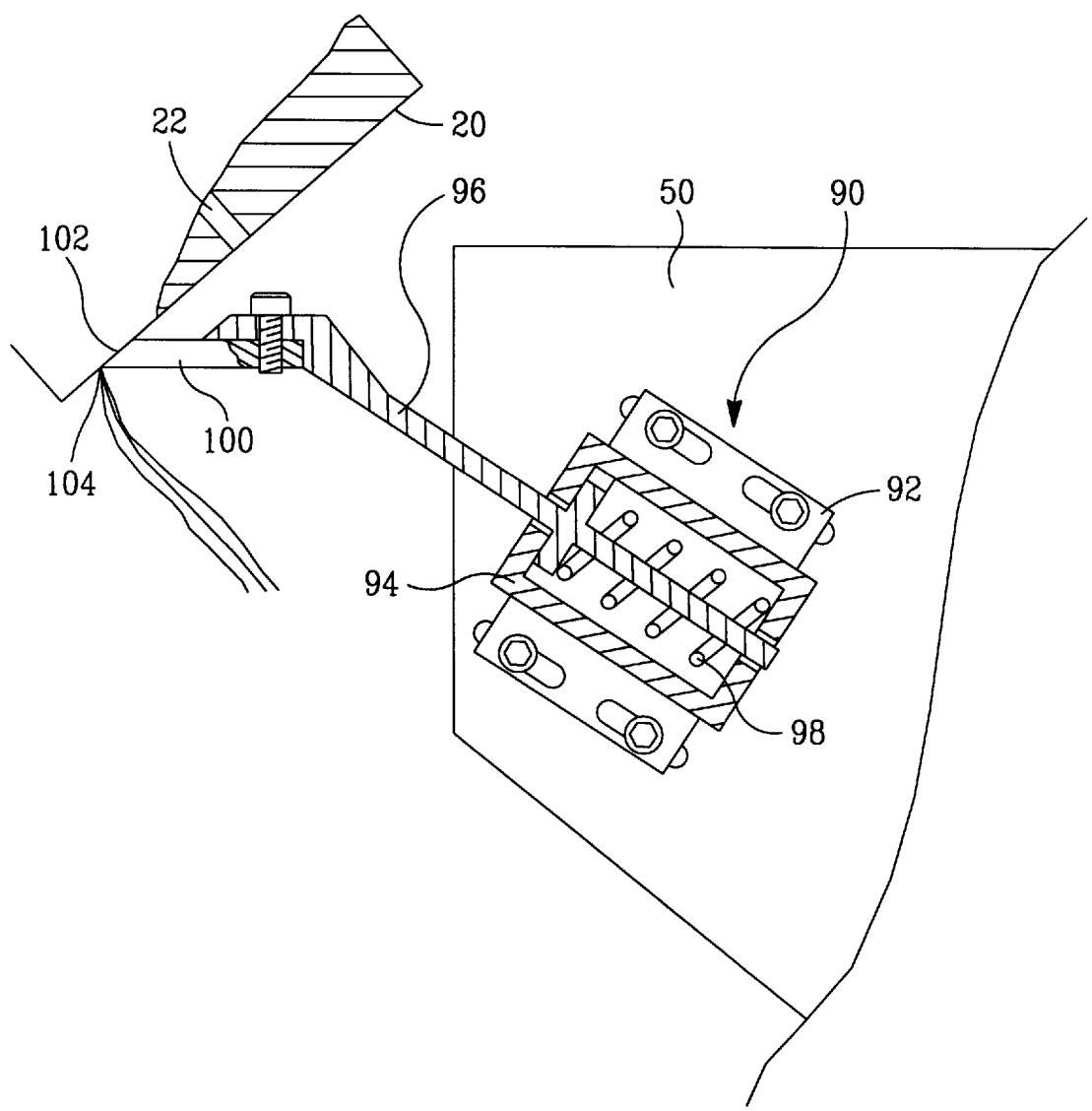
FIG. 5 is a sectional view showing a strand cutting means, mounted to the movable unit of the cooling trough and having a cutter, according to the primary embodiment of this invention.

FIG. 5 is a sectional view showing a strand cutting means, which is attached to the movable unit 50 in accordance with the primary embodiment of the present invention. As shown in FIG. 5, the strand cutting means 90 comprises a holder support 92, which is mounted to each side wall of the movable unit 50 using a plurality of lock bolts. The support 92 has a case 94 with a compression coil spring 98. The support 92 holds a cutter holder 96, which is received in the case 94 with the compression coil spring 98 normally biasing the holder 96 toward the nozzle surface 20. Attached to the tip of the holder 96 is a cutter 100. Since the holder 96 is spring-biased as described above, the cutter 100 is brought into resilient contact with the nozzle surface 20 while cutting the bad strands emerging from the nozzles 22.

The cutter 100, attached to the tip of the holder 96, has a slant tip surface 102 and a cutting edge 104, which are shaped into appropriate configurations suitable for effectively cutting away the strands emerging from the nozzles 22 of the nozzle surface 20.

As described above, the holder 96 received in the case 94 is biased by the compression coil spring 98 so that the cutter 100 is rarely shocked or overloaded while the cutter 100 moves on the nozzle surface 20 and cuts away the first bad strands. Such a spring-biased structure of the cutting means 90 allows the cutter 100 to be rarely deformed or damaged and minimizes the frictional abrasion of the cutting edge 104 of the cutter 100.

Figure 6:
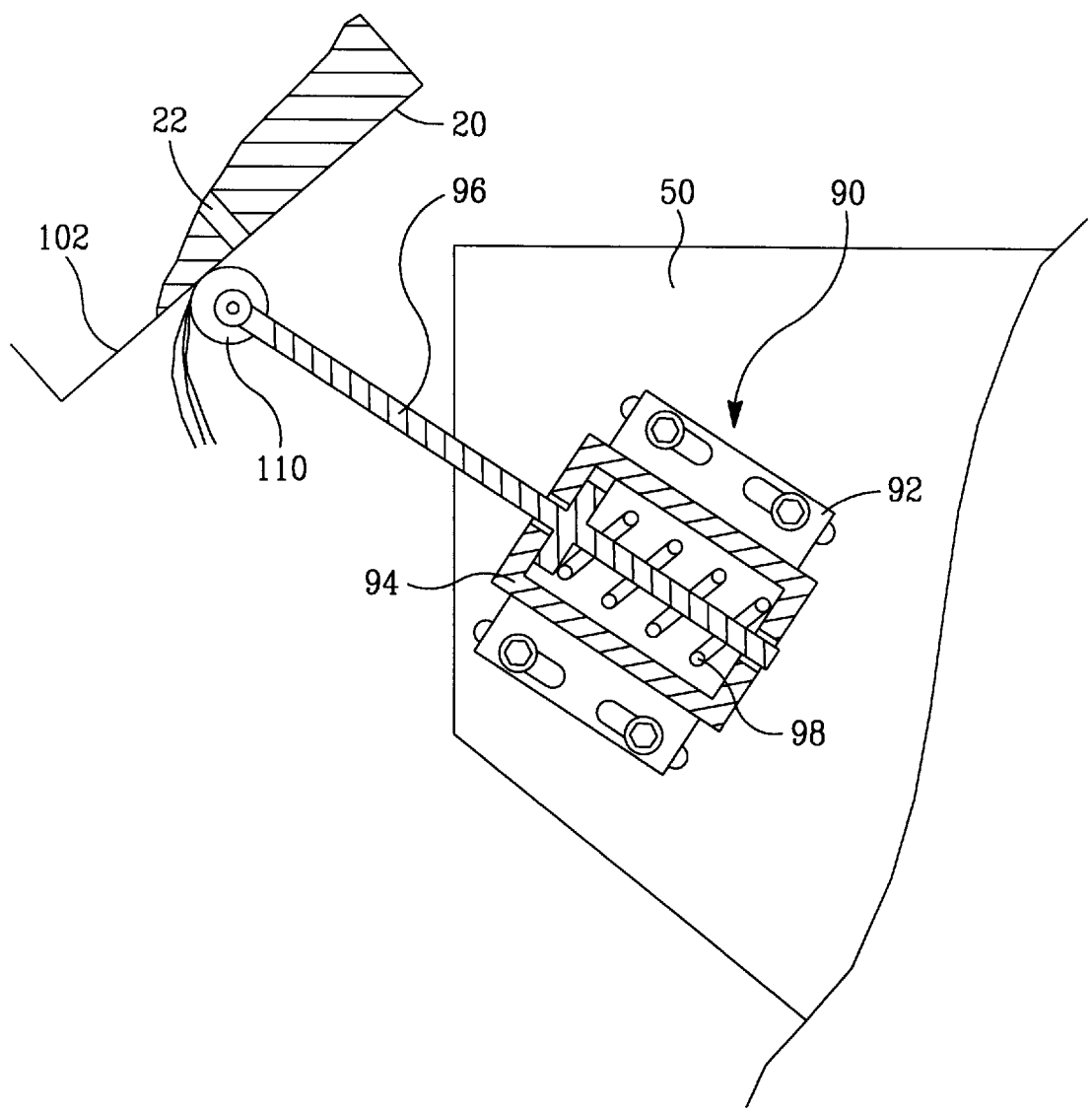
FIG. 6 is a sectional view showing a strand cutting means, having a cutting roller in place of the cutter, according to another embodiment of this invention.
Figure 7:
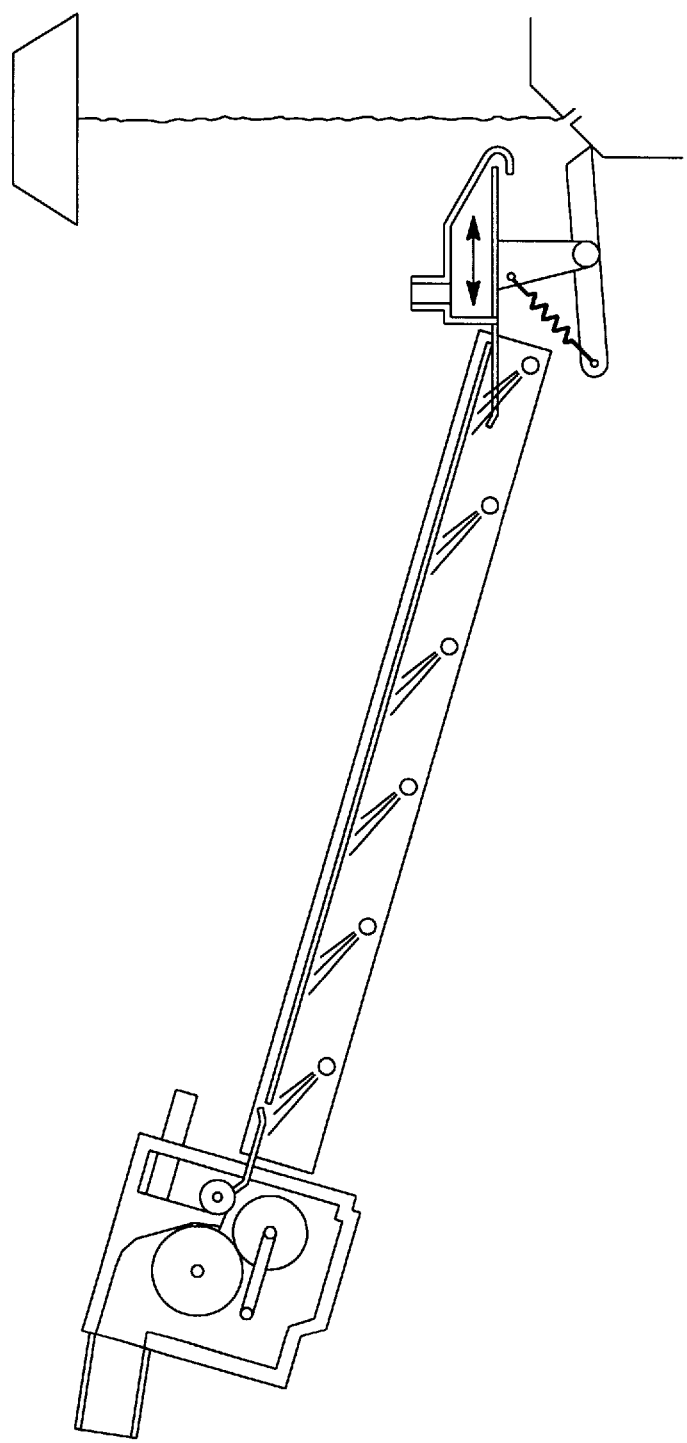
FIG. 7 is a view showing a horizontal-type strand feeding device according to the prior art.
Figure 8:
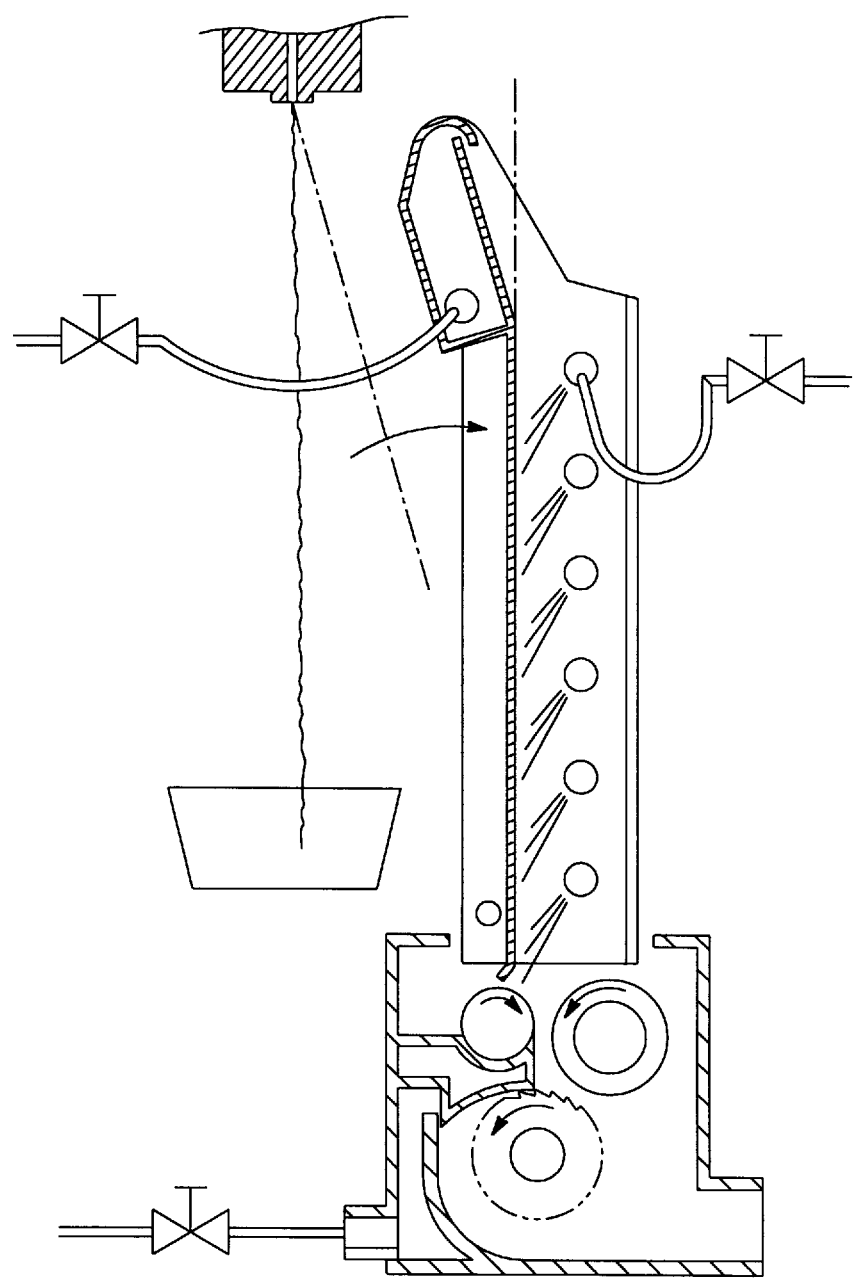
FIG. 8 is a view showing a vertical-type strand feeding device according to the prior art.

FIG. 6 shows a strand cutting means according to another embodiment of this invention. As shown in the drawing, the general shape of the strand cutting means remains the same as in the embodiment of FIG. 5. But, the tip of the holder 96 has a cutting roller 110 in place of the cutter 100. The cutting roller 110 cuts away the first bad strands through the same cutting process and yields the same result as those described for the embodiment of FIG. 5.

In the operation of the device with the cutting roller 110, the molten resin strands emerge from the nozzles 22 at temperatures of about 260° C.–270° C. Therefore, when the cutting roller 110 rolls on the nozzle surface 20, the roller effectively cuts away the bad strands. Therefore, the cutting roller 110 rarely causes frictional abrasion of the nozzle surface 20 and smoothly rolls on the nozzle surface thus being almost completely free from being overloaded while cutting the strands.

As described above, the present invention provides a molten strand feeding device, which is used for controllably feeding molten resin strands to a strand granulator while removing first bad strands. In the device of this invention, a movable unit is attached to the upper end of a cooling trough so that the unit is linearly movable in a direction parallel to the nozzle surface, from which the molten strands emerge. The device of this invention improves the operational effect when it cuts away the first bad strands at the very beginning of the strand emerging from the nozzles. Another advantage of the device resides in that the cooling trough is selectively rotatable relative to the nozzle surface so that the type of the device can be easily changed between the horizontal and vertical types.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A molten resin strand feeding device used for controllably feeding molten resin strands emerging from nozzles of a nozzle surface to a strand granulator while cutting away first bad strands, comprising a cooling trough sided by two side panels and a cooling pipe extending on said trough and selectively spraying coolant onto molten strands passing over the trough thus cooling the strands, said device further comprising:

a rotatable panel rotatable mounted to an upper end of each of said side panels about a rotating shafts each of said rotatable panels having an adjusting slit receiving a plurality of lock bolts, wherein said lock bolts extend through said adjusting slit and engage said side panel to selectively position said rotatable panel relative to said side panel;

a drive unit mounted to one of said rotatable panels;

a movable unit connected to and driven by said drive unit wherein said drive unit is adapted to linearly move said movable unit in parallel to the nozzle surface, said movable unit having a guide panel used for cutting away the first bad strands emerging from the nozzles at the very beginning of the strand emerging from the nozzles; and rotating means for allowing said cooling trough to be selectively rotated relative to the nozzle surface, said rotating means being provided on the rear center of the cooling trough.

2. The molten resin strand feeding device according to claim 1, wherein said drive unit comprises:

a rodless cylinder positioned outside said rotatable panel and being linearly movable;

a guide shaft adapted for guiding the drive unit when the rodless cylinder linearly moves;

a bracket covering both the rodless cylinder and the guide shaft; and a connection means for connecting the drive unit to the movable unit, said connection means being provided at the upper end of said bracket.

3. The molten resin strand feeding device according to claim 1, wherein said rotating means comprises:

a rotating shaft rotatably mounted to a support bracket; and angle control means for selectively adjusting the angular position of said rotating shaft, thus allowing the cooling trough to be selectively rotated relative to the nozzle surface.

4. The molten resin strand feeding device according to claim 1, wherein said movable unit has means for cutting away the first bad strands, said strand cutting means comprising:

a holder support mounted to each side wall of said movable unit using a plurality of lock bolts, said support having a case with a compression coil spring;

a cutter holder received in said case of the support, with the compression coil spring normally biasing said holder toward the nozzle surface; and a cutter attached to the tip of said holder.

5. The molten resin strand feeding device according to claim 4, wherein said cutter has a slant tip surface and a cutting edge, said cutting edge being shaped into a configuration suitable for cutting away the bad strands emerging from the nozzles.

6. The molten resin strand feeding device according to claim 1, wherein said movable unit has means for cutting away the first bad strands, said strand cutting means comprising:

a holder support mounted to each side wall of said movable unit using a plurality of lock bolts, said support having a case with a compression coil spring;

a cutter holder received in said case of the support, with the compression coil spring normally biasing said holder toward the nozzle surface; and a cutting roller attached to the tip of said holder.

* * * * *